United States Patent
Saito et al.

(10) Patent No.: US 10,650,675 B2
(45) Date of Patent: May 12, 2020

(54) DISPLAY SYSTEM AND IN-VEHICLE SYSTEM

(71) Applicant: Yazaki Corporation, Tokyo (JP)

(72) Inventors: Masaki Saito, Shizuoka (JP); Shinichi Okamoto, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/289,896

(22) Filed: Mar. 1, 2019

(65) Prior Publication Data

US 2019/0272749 A1  Sep. 5, 2019

(30) Foreign Application Priority Data

Mar. 5, 2018  (JP) ................. 2018-038180

(51) Int. Cl.
*G08G 1/0962* (2006.01)
*B60K 35/00* (2006.01)
*B60Q 1/50* (2006.01)
*B60R 1/00* (2006.01)
*G06F 1/00* (2006.01)
(Continued)

(52) U.S. Cl.
CPC .......... *G08G 1/0962* (2013.01); *B60K 35/00* (2013.01); *B60Q 1/268* (2013.01); *B60Q 1/2692* (2013.01); *B60Q 1/50* (2013.01); *B60Q 9/00* (2013.01); *B60R 1/00* (2013.01); *G02B 27/01* (2013.01); *G06F 1/00* (2013.01); *B60K 2370/155* (2019.05); *B60K 2370/334* (2019.05); *B60K 2370/55* (2019.05); *G02B 2027/014* (2013.01); *G02B 2027/0138* (2013.01); *G02B 2027/0156* (2013.01)

(58) Field of Classification Search
CPC .......... B60Q 9/008; B60Q 1/54; B60Q 1/444; B60Q 1/50; B60Q 1/503; B60Q 1/22; B60Q 1/2611; B60Q 1/525; B60Q 1/26; B60K 35/00; G08G 1/096716
See application file for complete search history.

(56) References Cited

U.S. PATENT DOCUMENTS 4,864,754 A * 9/1989 Sangu .................... B60Q 1/503
40/593
7,659,808 B1 * 2/2010 Cooper .................. B60Q 1/503
340/425.5
(Continued)

FOREIGN PATENT DOCUMENTS

DE  10 2013 216 490 A1  2/2015
DE  10 2014 221 821 A1  4/2016
(Continued)

*Primary Examiner* — Hoi C Lau
(74) *Attorney, Agent, or Firm* — Sughrue Mion, PLLC

(57) ABSTRACT

A display system and an in-vehicle system include a display device provided at a vehicle and configured to display a person image indicating a person at a position visible from the outside of the vehicle; and a controller configured to acquire surrounding status information indicating a surrounding status of the vehicle and control the display device based on the acquired surrounding status information, thereby the executing external display processing of displaying the person image. As a result, the display system and the in-vehicle system provide an advantageous effect that easily-understandable displaying can be performed.

10 Claims, 6 Drawing Sheets

(51) Int. Cl.
   *B60Q 9/00*   (2006.01)
   *B60Q 1/26*   (2006.01)
   *G02B 27/01*  (2006.01)

(56) References Cited

U.S. PATENT DOCUMENTS

| | | | | |
|---|---|---|---|---|
| 9,959,768 | B2* | 5/2018 | Leppanen | B60Q 1/50 |
| 10,169,885 | B2* | 1/2019 | Sumikawa | G06T 7/70 |
| 10,183,616 | B2* | 1/2019 | King | B60Q 1/50 |
| 10,279,683 | B2* | 5/2019 | Torii | B60K 35/00 |
| 10,311,735 | B2* | 6/2019 | Sato | B60K 35/00 |
| 2005/0052348 | A1* | 3/2005 | Yamazaki | B60W 30/095 345/44 |
| 2005/0099287 | A1* | 5/2005 | Su | B60Q 1/22 340/464 |
| 2006/0235597 | A1* | 10/2006 | Hori | B60Q 1/50 701/96 |
| 2007/0182664 | A1* | 8/2007 | Himmele | A42B 1/248 345/8 |
| 2012/0044090 | A1* | 2/2012 | Kahler | B60Q 1/50 340/905 |
| 2015/0077235 | A1* | 3/2015 | Pisz | B60R 25/104 340/426.23 |
| 2015/0094118 | A1* | 4/2015 | Rodolico | H04M 1/0264 455/566 |
| 2015/0336502 | A1* | 11/2015 | Hillis | B60Q 1/26 701/23 |
| 2017/0190286 | A1* | 7/2017 | Yavitz | B60Q 1/54 |
| 2017/0197544 | A1* | 7/2017 | Wang | G08G 1/096716 |
| 2017/0227769 | A1* | 8/2017 | Tatekawa | G02B 27/0149 |
| 2017/0240098 | A1* | 8/2017 | Sweeney | B60Q 1/2611 |
| 2017/0243490 | A1* | 8/2017 | Leppanen | B60Q 1/50 |
| 2018/0184959 | A1* | 7/2018 | Takahashi | A61B 5/7445 |
| 2018/0260182 | A1* | 9/2018 | Suzuki | G06F 3/1423 |
| 2018/0264940 | A1* | 9/2018 | Torii | B60K 28/02 |
| 2018/0264941 | A1* | 9/2018 | Sato | B60K 28/02 |
| 2018/0264944 | A1* | 9/2018 | Torii | G02B 27/01 |
| 2018/0264945 | A1* | 9/2018 | Torii | B60K 35/00 |
| 2018/0268230 | A1* | 9/2018 | Torii | B60K 35/00 |
| 2018/0268564 | A1* | 9/2018 | Sumikawa | G06T 7/70 |
| 2018/0268701 | A1* | 9/2018 | Sato | B60Q 9/008 |
| 2018/0309703 | A1* | 10/2018 | Ihara | G06K 9/00221 |
| 2018/0361916 | A1* | 12/2018 | King | B60Q 1/50 |

FOREIGN PATENT DOCUMENTS

| | | |
|---|---|---|
| EP | 2 993 083 A1 | 3/2016 |
| JP | 2001-334867 A | 12/2001 |

* cited by examiner

DISPLAY SYSTEM AND IN-VEHICLE SYSTEM

CROSS-REFERENCE TO RELATED APPLICATION(S)

The present application claims priority to and incorporates by reference the entire contents of Japanese Patent Application No. 2018-038180 filed in Japan on Mar. 5, 2018.

BACKGROUND OF THE INVENTION

1. Field of the Invention

The present invention relates to a display system and an in-vehicle system.

2. Description of the Related Art

For example, Japanese Patent Application Laid-open No. 2001-334867 discloses, as a conventional display system mounted on a vehicle, a display device configured to display such an intention that a driver driving a moving vehicle gives way. This display device includes a display and a display switch. The display is arranged so that an indication of the intention of giving way can be recognized from the front of the moving vehicle via light emission of a light emitter. The display switch is provided so that the driver can operate the display switch, and switches light emission of the light emitter.

The display device described in Japanese Patent Application Laid-open No. 2001-334867 has room for further improvement in displaying for a person outside the vehicle, for example.

SUMMARY OF THE INVENTION

The present invention has been made in view of the above-described situation, and intended to provide a display system and an in-vehicle system configured so that easily-understandable display can be performed.

In order to achieve the above mentioned object, a display system according to one aspect of the present invention includes a display device provided at a vehicle and configured to display a person image indicating a person at a position visible from an outside of the vehicle; and a controller configured to control the display device based on surrounding status information indicating a surrounding status of the vehicle, thereby executing external display processing of displaying the person image.

According to another aspect of the present invention, in the display system, it is possible to configure that the controller executes the external display processing of changing an expression or a gesture of the person indicated by the person image according to the surrounding status information.

According to still another aspect of the present invention, in the display system, it is possible to configure that the display device has a display surface configured to display the person image on a window shield, the window shield being provided at the vehicle and at least a visible light component of light being permeable through the window shield.

According to still another aspect of the present invention, in the display system, it is possible to configure that the display device has a display surface movable between a display position at which the person image is displayed at a position facing a window shield inside the vehicle and a retraction position retracted from the display position, the window shield being provided at the vehicle and at least a visible light component of light being permeable through the window shield.

According to still another aspect of the present invention, in the display system, it is possible to configure that the display device has a display surface configured to display the person image on a body member, the body member being provided at the vehicle and blocking at least light with a visible light component.

According to still another aspect of the present invention, in the display system, it is possible to configure that the display device displays the person image at a position visible from an inside of the vehicle, and the controller controls the display device based on internal status information indicating an internal status of the vehicle, thereby executing internal display processing of displaying the person image.

In order to achieve the above mentioned object, a in-vehicle system according to still another aspect of the present invention includes a display device provided at a vehicle and configured to display a person image indicating a person at a position visible from an outside of the vehicle; a detection device configured to detect surrounding status information indicating a surrounding status of the vehicle; and a controller configured to control the display device based on the surrounding status information detected by the detection device, thereby executing external display processing of displaying the person image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Note that the present invention is not limited by this embodiment. Moreover, components in the embodiment below include those easily replaced by those skilled in the art, and those substantially identical to the components.

Embodiment

Figure 1:
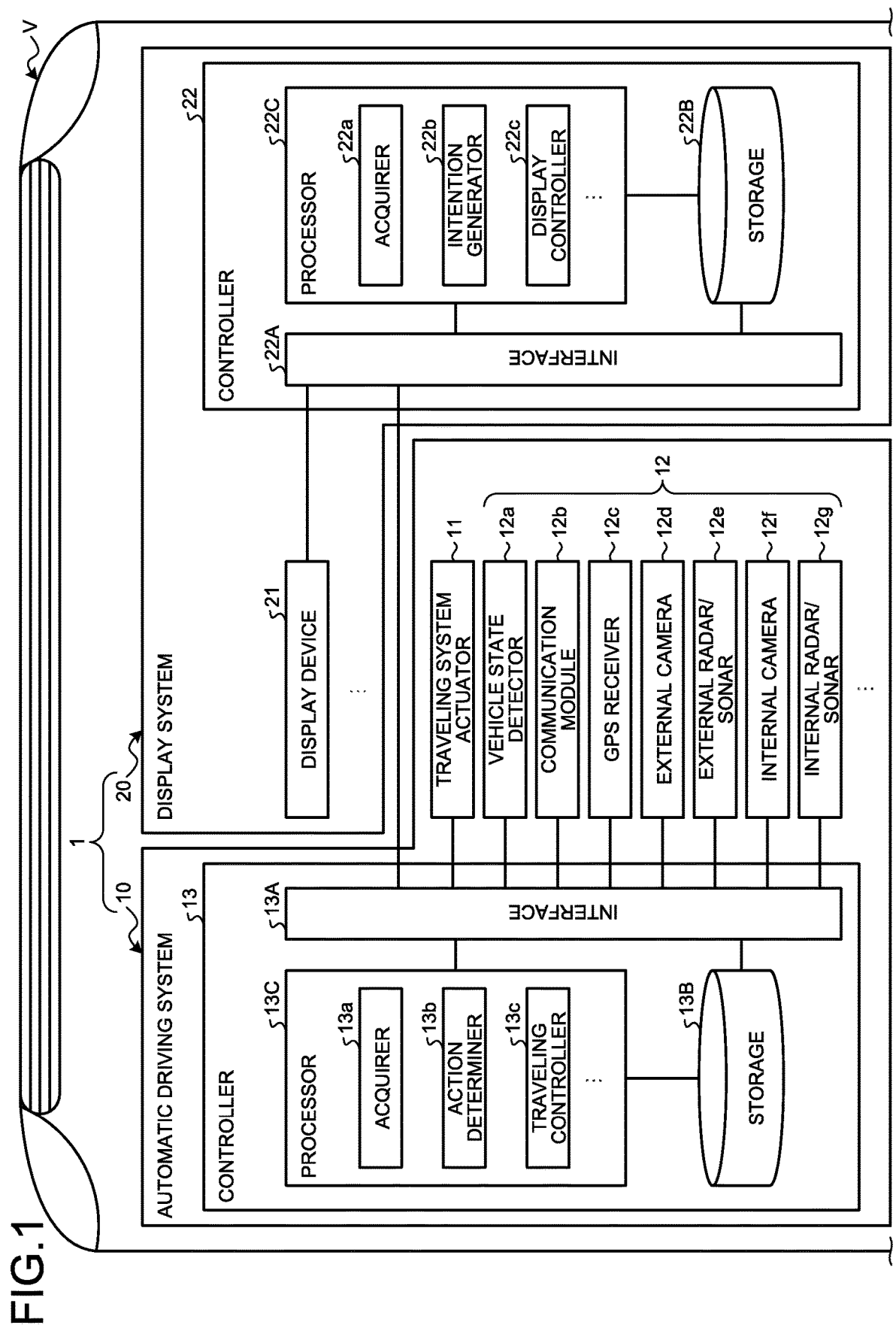
FIG. 1 is a block diagram illustrating a schematic configuration of an in-vehicle system according to an embodiment.

A display system 20 of the present embodiment illustrated in FIG. 1 is a system applied to a vehicle V and configured to perform various types of displaying. The vehicle V to which the display system 20 is applied may be any vehicle using a motor or an engine as a drive source, such as an electric vehicle (EV), a hybrid electric vehicle (HEV), a plug-in hybrid electric vehicle (PHEV), a gasoline vehicle, and a diesel vehicle. Moreover, driving of the vehicle V may be any driving such as manual driving by a driver, semi-automatic driving, and fully-automated driving. The vehicle V may be any vehicle such as a so-called private car owned by an individual, a rented car, a shared car, a bus, a taxi, and a ride-shared car.

In description below, the vehicle V will be, as one example, described as a vehicle allowing automatic driving (the semi-automatic driving, the fully-automated driving). The display system 20 described herein forms part of an in-vehicle system 1 mounted on the vehicle V. The in-vehicle system 1 realizes intuitive easily-understandable displaying for a person outside the vehicle V by means of a person image 100 (see FIG. 3 etc.) in addition to the so-called automatic driving at the vehicle V. The in-vehicle system 1 is realized in such a manner that components illustrated in FIG. 1 are mounted on the vehicle V. Hereinafter, each configuration of the in-vehicle system 1 will be described in detail with reference to FIG. 1.

Note that in the in-vehicle system 1 illustrated in FIG. 1, a connection method among the components for exchanging supplied power, a control signal, various types of information, etc. may be, unless otherwise provided, any of wired connection (e.g., also including optical communication via an optical fiber) via a wiring material such as an electric wire or an optical fiber and wireless connection such as wireless communication or non-contact power feeding.

Specifically, the in-vehicle system 1 includes an automatic driving system 10 and the display system 20.

First, the automatic driving system 10 will be described. The automatic driving system 10 is a system realizing the automatic driving at the vehicle V. The automatic driving system 10 is realized in such a manner that the components illustrated in FIG. 1 are mounted on the vehicle V. Specifically, the automatic driving system 10 includes a traveling system actuator 11, a detection device 12, and a controller 13.

The traveling system actuator 11 is various types of equipment configured to cause the vehicle V to travel. The traveling system actuator 11 typically includes a traveling power train, a steering device, a braking device, etc. The traveling power train is a drive device configured to cause the vehicle V to travel. The steering device is a device configured to steer the vehicle V. The braking device is a device configured to put a brake on the vehicle V.

The detection device 12 is configured to detect various types of information. For example, the detection device 12 detects vehicle state information, surrounding status information, and internal status information. The vehicle state information is information indicating a traveling state of the vehicle V. The surrounding status information is information indicating a surrounding status of the vehicle V. The internal status information is information indicating an internal status of the vehicle V. The vehicle state information may include, for example, vehicle speed information, acceleration (e.g., an acceleration in a vehicle front-to-rear direction, an acceleration in a vehicle width direction, and an acceleration in a vehicle roll direction) information, steering angle information, accelerator pedal operation amount (accelerator stepping-on amount) information, brake pedal operation amount (brake stepping-on amount) information, shift position information, current/voltage value information on each unit, and power storage amount information on a power storage device, on the vehicle V. The surrounding status information may include, for example, surrounding image information on a captured image of environment around the vehicle V or an external object such as a person, other vehicles, or an obstacle around the vehicle V, external object information indicating the presence or absence of the external object, a relative distance to the external object, a relative speed, time-to-collision (TTC), etc., white line information on a traffic lane on which the vehicle V is traveling, traffic information on a traveling path on which the vehicle V is traveling, and current position information (GPS information) on the vehicle V. The internal status information may include, for example, internal image information on a captured image of environment inside the vehicle V or an internal object such as a person or a luggage inside the vehicle V, and internal object information on the presence or absence of the internal object, the position of the internal object, etc.

The detection device 12 illustrated in FIG. 1 is, as one example, illustrated as one including a vehicle state detector 12a, a communication module 12b, a GPS receiver 12c, an external camera 12d, an external radar/sonar 12e, an internal camera 12f, and an internal radar/sonar 12g. The vehicle state detector 12a detects the vehicle state information including, e.g., the vehicle speed information, the acceleration information, the steering angle information, the accelerator pedal operation amount information, the brake pedal operation amount information, the shift position information, the current/voltage value information, and the power storage amount information. The vehicle state detector 12a includes, for example, various detectors or sensors such as a vehicle speed sensor, an acceleration sensor, a steering angle sensor, an accelerator sensor, a brake sensor, a shift position sensor, and a current/voltage meter. The vehicle state detector 12a may include a processor itself such as an electronic control unit (ECU) configured to control each unit of the vehicle V. The communication module 12b transmits information to or receives information from equipment outside the vehicle V, such as other vehicles, a road machine, cloud equipment, or electronic equipment held by a person outside the vehicle V, via wireless communication. Thus, the communication module 12b detects, for example, the surrounding status information including, e.g., the surrounding image information, the external object information, the traffic information, and the current position information. The communication module 12b communicates with external equipment via various types of wireless communication methods such as wide-area wireless communication and narrow-area wireless communication. The wide-area wireless communication method described herein includes, for example, radio (AM, FM), TV (UHF, 4K, 8K), TEL, GPS, and WiMAX (registered trademark). Moreover, the narrow-area wireless communication method includes, for example, ETC/DSRC, VICS (registered trademark), wireless LAN, and millimetric communication. The GPS receiver 12c detects, as the surrounding status information, the current position information indicating the current position of the vehicle V. The GPS receiver 12c receives a radio wave transmitted from a GPS satellite to acquire the GPS information (lat/long coordinates) on the vehicle V as the current position information. The external camera 12d captures, as the surrounding status information, a surrounding image of the vehicle V forming the surrounding image information or a traveling road surface image of the vehicle V forming the white line information. The external radar/sonar 12e detects, as the surrounding status information, the external object information by means of infrared light, a millimeter wave, an ultrasonic wave, etc. The internal camera 12f captures, as the internal status information, an internal image of the vehicle V forming the internal image information. The internal radar/sonar 12g detects, as the internal status information, the internal object information by means of infrared light, a millimeter wave, an ultrasonic wave, etc.

The controller 13 is configured to integrally control each unit of the automatic driving system 10. The controller 13 may be also used by the electronic control unit configured to integrally control the entirety of the vehicle V. The controller 13 executes various types of arithmetic processing for realizing traveling of the vehicle V. The controller 13 includes an electronic circuit mainly including a well-known microcomputer having a central arithmetic processing unit such as a central processing unit (CPU), a micro processing unit (MPU), an application specific integrated circuit (ASIC), or a field programmable gate array (FPGA), a read only memory (ROM), a random access memory (RAM), and an interface. The controller 13 is electrically connected to the traveling system actuator 11 and the detection device 12. The controller 13 can exchange various electrical signals such as various detection signals and a drive signal for driving each unit with each unit.

Specifically, the controller 13 includes, as functional concepts, an interface 13A, a storage 13B, and a processor 13C. The interface 13A, the storage 13B, and the processor 13C can exchange various types of information with various types of electrically-connected equipment. The interface 13A is an interface for transmitting various types of information to or receiving various types of information from each unit of the automatic driving system 10 such as the traveling system actuator 11 and the detection device 12. Moreover, the interface 13A is configured so that various types of information can be transmitted to or received from the display system 20. The interface 13A has the function of performing wired communication of information with each unit via an electrical wire etc., and the function of performing wireless communication of information with each unit via a wireless communication unit etc. The storage 13B is a storage device of an automatic driving system. The storage 13B may be, for example, a relatively-high-capacity storage device such as a hard disk, a solid state drive (SSD), or an optical disk, or a data-rewritable semiconductor memory such as a RAM, a flash memory, or a non-volatile static random access memory (NVSRAM). The storage 13B stores, for example, conditions or information necessary for various types of information at the controller 13, various programs or applications executed by the controller 13, and control data. For example, the storage 13B stores, as a database, map information indicating a map referred when the current position of the vehicle V is specified based on the current position information detected by the GPS receiver 12c and action prediction information used for later-described action prediction etc. Moreover, the storage 13B can temporarily store, for example, various types of information detected by the detection device 12 or various types of information acquired by a later-described acquirer 13a. These types of information in the storage 13B are read as necessary by the processor 13C etc. The processor 13C is a unit configured to execute various programs stored in the storage 13B based on various input signals etc. to output an output signal to each unit by operation of these programs, thereby executing various types of processing for realizing various functions.

More specifically, the processor 13C includes, as functional concepts, the acquirer 13a, an action determiner 13b, and a traveling controller 13c.

The acquirer 13a is a unit having the function of executing the processing of acquiring various types of information used for various types of processing in the automatic driving system 10. The acquirer 13a acquires, for example, the vehicle state information, the surrounding status information, and the internal status information detected by the detection device 12. The acquirer 13a can also store various types of acquired information in the storage 13B.

The action determiner 13b is a unit having the function of executing the processing of predicting action of a person around the vehicle V to determine action of the vehicle V. The action determiner 13b is configured to execute the processing of predicting action of a person around the vehicle V to determine action of the vehicle V by means of various well-known artificial intelligence techniques or deep learning techniques, for example. For example, the action determiner 13b predicts action of a person around the vehicle V to determine action of the vehicle V based on, e.g., the action prediction information stored in the storage 13B. The action prediction information is information on which a result of learning of action of a person around the vehicle V according to the surrounding status information etc. is reflected by various methods using the artificial intelligence technique or the deep learning technique. In other words, the action prediction information is information as a databased formed by means of various methods using the artificial intelligence technique or the deep learning technique for predicting action of a person around the vehicle V based on the surrounding status information etc. Typically, the action determiner 13b predicts, as a person around the vehicle V, action of a passerby such as a pedestrian or drivers of other vehicles. For example, the action determiner 13b grasps the environment around the vehicle V based on the surrounding image information included in the surrounding status information acquired by the acquirer 13a and the action prediction information stored in the storage 13B, thereby predicting action of a passerby or drivers of other vehicles. More specifically, based on, e.g., an expression or a gesture of a passerby included in the surrounding image information and the above-described action prediction information, the action determiner 13b predicts action of the passerby, thereby predicting crossing of the passerby at a cross walk (see, e.g., a passerby A illustrated in FIG. 3 as described later). Moreover, based on, e.g., expressions or gestures of drivers of other vehicles included in the surrounding image information and the above-described action prediction information, the action determiner 13b predicts action of the drivers of the other vehicles, thereby estimating crossing or standby of the other vehicles at an intersection (see, e.g., another vehicle B illustrated in FIG. 4 as described later). For example, based on an expression or a gesture of a passerby included in the surrounding image information and the above-described action prediction information, the action determiner 13b predicts action of the passerby, thereby estimating a passerby's intention to ride on the vehicle V (see, e.g., a passerby C illustrated in FIG. 6 as described later). Then, the action determiner 13b determines action of the vehicle V according to predicated action of a person around the vehicle V. For example, in a case where crossing of a passerby at a cross walk, crossing of other vehicles at an intersection, or a passerby's intention to ride on the vehicle V is predicted, the action determiner 13b determines that "stop" is performed as action of the vehicle V. For example, in a case where standby of other vehicles at an intersection is predicated, the action determiner 13b determines that "passage through the intersection" is performed as action of the vehicle V. For example, in a case where it is predicted that a passenger left the vehicle V moves away from the vehicle V, the action determiner 13b determines that "start" is performed as action of the vehicle V.

The traveling controller 13c is a unit having the function of executing the processing of controlling operation of each unit of the vehicle V to control traveling of the vehicle V. The traveling controller 13c controls the traveling system actuator 11 based on the information (the vehicle state information, the surrounding status information, the internal status information, etc.) acquired by the acquirer 13a, and executes various types of processing regarding traveling of the vehicle V. The traveling controller 13c of the present embodiment executes various types of processing regarding the automatic driving of the vehicle V to perform the automatic driving of the vehicle V. The automatic driving of the vehicle V by the traveling controller 13c is driving for automatically controlling, based on the information acquired by the acquirer 13a, behavior of the vehicle V in priority to driving operation by the driver of the vehicle V or regardless of driving operation by the driver. The automatic driving includes the semi-automatic driving involving a certain level of driving operation by the driver, and the fully-automated driving not involving driving operation by the driver. The semi-automatic driving includes, for example, driving such as vehicle attitude stabilization control (VSC: Vehicle Stability Control), constant speed travel/inter-vehicular distance control (ACC: Adaptive Cruise Control), or traffic lane keeping assist (LKA: Lane Keeping Assist). The fully-automated driving includes, for example, driving for automatically causing the vehicle V to travel to a destination, and a driving for automatically causing multiple vehicles V to travel in line. In the case of the fully-automated driving, the driver oneself might be absent in the vehicle V. The traveling controller 13c of the present embodiment performs such control that action of the vehicle V determined by the action determiner 13b according to a prediction result of action of a person around the vehicle V is reflected on traveling of the vehicle V. In other words, the traveling controller 13c also performs the automatic driving of the vehicle V based on the prediction result of action of a person around the vehicle V by the action determiner 13b. For example, in a case where the action determiner 13b has predicted crossing of a passerby at a cross walk, crossing of other vehicles at an intersection, or a passerby's intention to ride on the vehicle V and "stop" is determined as action of the vehicle V, the traveling controller 13c automatically stops the vehicle V. For example, in a case where the action determiner 13b has predicted standby of other vehicles at an intersection and "passage through the intersection" is determined as action of the vehicle V, the traveling controller 13c automatically causes the vehicle V to pass through the intersection. For example, in a case where the action determiner 13b has predicted that a passenger left the vehicle V moves away from the vehicle V and "start" is determined as action of the vehicle V, the traveling controller 13c automatically starts the vehicle V.

Next, the display system 20 will be described. The display system 20 is a system configured to perform intuitive easily-understandable displaying for a person outside the vehicle V by means of the person image 100 (see FIG. 3 etc.). The display system 20 is realized in such a manner that the components illustrated in FIG. 1 are mounted on the vehicle V. Specifically, the display system 20 includes a display device 21 and a controller 22.

Figure 2:
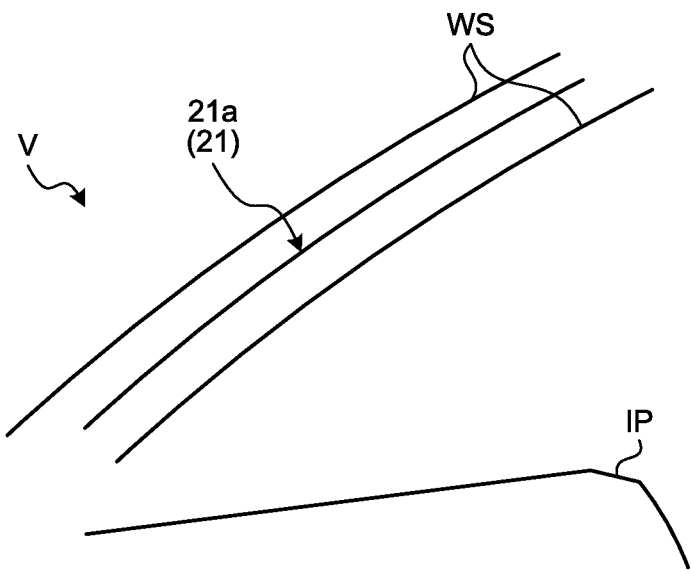
FIG. 2 is a schematic sectional view illustrating one example of a display device included in a display system according to the embodiment.
Figure 3:
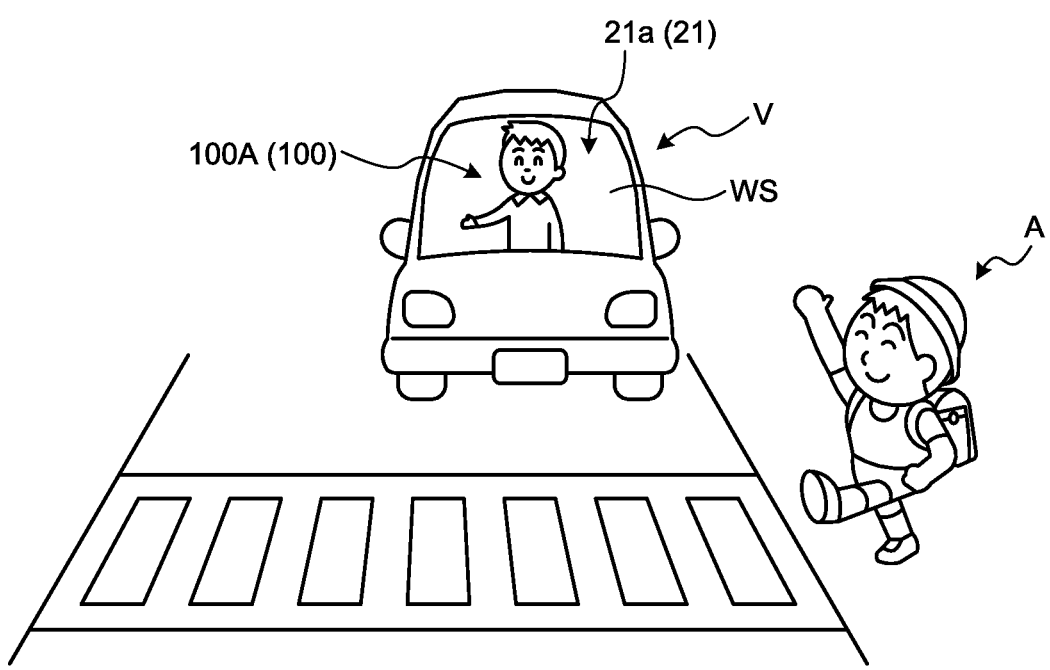
FIG. 3 is a schematic view illustrating one example of a display form of the display system according to the embodiment.

As illustrated in FIGS. 2 and 3, the display device 21 is provided at the vehicle V, and is configured to display the person image 100 at a position visible from the outside of the vehicle V. The person image 100 described herein is an image indicating a person. The person image 100 may be an actual image of a person oneself, an illustration image representing a person, or a so-called avatar image, for example. The display device 21 of the present embodiment has a display surface 21a configured to display the person image 100 on a window shield WS of the vehicle V. The window shield WS is a light-permeable transmission member through which at least a visible light component of light (visible light) is permeable. The visible light component of light as described herein is light with a wavelength component in a visible light range visible by a person, and for example, is light with a component within a wavelength range of 360 to 830 nm. The window shield WS described herein is provided at a front portion of the vehicle V in the vehicle front-to-rear direction, and is also so-called a front glass. The window shield WS also functions as a partition wall configured to separate the inside and outside of the vehicle V. The display surface 21a of the present embodiment is configured such that, e.g., a thin film display of transparent electronic luminescent (EL) or transparent liquid crystal is interposed as an intermediate film between a pair of window shields WS. The display surface 21a may be provided across the entirety of the window shield WS, or may be provided at part of the window shield WS. The display surface 21a described herein is provided across the substantially entirety of the window shield WS provided above an instrumental panel IP, and displays the substantially life-sized person image 100 indicating a person. The instrumental panel IP is an interior member provided inside (a vehicle inner side) the vehicle V, and is provided to extend along the vehicle width direction crossing the vehicle front-to-rear direction on a front side in the vehicle front-to-rear direction. As described above, the display device 21 of the present embodiment displays the person image 100 on the display surface 21a provided at the window shield WS so that the person image 100 can be displayed at a position visible not only from the outside (a vehicle outer side) of the vehicle V but also from the inside (the vehicle inner side) of the vehicle V.

Referring back to FIG. 1, the controller 22 integrally controls each unit of the display system 20. The controller 22 may be also used by the electronic control unit configured to integrally control the entirety of the vehicle V. The controller 22 executes various types of arithmetic processing for realizing various types of displaying in the display system 20. The controller 22 includes an electronic circuit mainly including a well-known microcomputer having a central arithmetic processing unit such as a CPU, a MPU, an ASIC, or a FPGA, a ROM, a RAM, and an interface. The controller 22 is electrically connected to the display device 21. The controller 22 can exchange various electrical signals such as various detection signals and a drive signal for driving each unit with each unit.

Specifically, the controller 22 includes, as functional concepts, an interface 22A, a storage 22B, and a processor 22C. The interface 22A, the storage 22B, and the processor 22C can exchange various types of information with various types of electrically-connected equipment. The interface 22A is an interface for transmitting various types of information to or receiving various types of information from each unit of the display system 20 such as the display device 21. Moreover, the interface 22A is configured so that various types of information can be also transmitted to or received from the interface 13A of the controller 13 of the automatic driving system 10. The interface 22A has the function of performing wired communication of information with each unit via an electrical wire etc., and the function of performing wireless communication of information with each unit via a wireless communication unit etc. The storage 22B is a storage device of the display system. The storage 22B may be, for example, a relatively-high-capacity storage device such as a hard disk, a SSD, or an optical disk, or a data-rewritable semiconductor memory such as a RAM, a flash memory, or a NVSRAM. The storage 22B stores, for example, conditions or information necessary for various types of information at the controller 22, various programs or applications executed by the controller 22, and control data. For example, the storage 22B stores image information on the person image 100 displayed by the display device 21 and other types of output information. Moreover, the storage 22B stores, as a database, intention generation information used for later-described intention generation, for example. Further, the storage 22B can temporarily store, for example, various types of information acquired by a later-described acquirer 22a. These types of information in the storage 22B are read as necessary by the processor 22C etc. The processor 22C is a unit configured to execute various programs stored in the storage 22B based on various input signals etc. to output an output signal to each unit by operation of these programs, thereby executing various types of processing for realizing various functions.

More specifically, the processor 22C includes, as functional concepts, the acquirer 22a, an intention generator 22b, and a display controller 22c.

The acquirer 22a is a unit having the function of executing the processing of acquiring various types of information used for various types of processing in the display system 20. The acquirer 22a acquires, for example, the vehicle state information, the surrounding status information, and the internal status information detected by the detection device 12 from the controller 13. In other words, the acquirer 22a acquires, via the controller 13, the vehicle state information, the surrounding status information, the internal status information, etc. detected by the detection device 12. Moreover, the acquirer 22a also acquires action determination result information by the action determiner 13b from the controller 13. The action determination result information is information regarding an action determination result of the vehicle V according to a prediction result of action of a person around the vehicle V by the action determiner 13b. The acquirer 22a can also store various types of acquired information in the storage 22B.

The intention generator 22b is a unit having the function of executing the processing of generating display contents to be displayed by the person image 100. The display contents to be displayed by the person image 100 are typically those on which an "intention of the passenger of the vehicle V" desirably transmitted from a person indicated by the person image 100 to a person around the vehicle V is reflected. For example, the intention generator 22b is configured to execute the processing of generating the display contents according to the intention of the passenger of the vehicle V by means of various well-known artificial intelligence techniques or deep learning techniques. For example, the intention generator 22b generates, based on the intention generation information etc. stored in the storage 22B, the display contents of the person image 100 according to the intention of the passenger of the vehicle V. The intention generation information is information on which a learning result of the display contents desired to be displayed by the person image 100 is reflected according to, e.g., the surrounding status information and the action determination result information by the action determiner 13b by various methods using the artificial intelligence technique or the deep learning technique. In other words, the intention generation information is information as a database formed by means of various methods using the artificial intelligence technique or the deep learning technique for generating the display contents of the person image 100 according to the intention of the passenger of the vehicle V based on the surrounding status information, the action determination result information etc. For example, based on the surrounding image information included in the surrounding status information acquired by the acquirer 22a, the action determination result information acquired by the acquirer 22a, and the intention generation information stored in the storage 22B, the intention generator 22b generates the display contents indicating an intension corresponding to action of the vehicle V determined according to predicated action of a person around the vehicle V.

For example, the intention generator 22b changes an expression or a gesture of a person indicated by the person image 100, thereby generating the display contents indicating various intensions corresponding to determined action of the vehicle V. For example, the intention generator 22b generates, as the display contents indicating various intensions corresponding to action of the vehicle V, the person image 100 (see, e.g., a person image 100A of FIG. 3) with the display contents indicating an intention of "giving way," the person image 100 (see, e.g., a person image 100B of FIG. 5) with the display contents indicating an intention of "appreciation," the person image 100 (see, e.g., a person image 100C of FIG. 6) with the display contents indicating an intention of "welcome," and the person image 100 (see, e.g., a person image 100D of FIG. 7) with the display contents indicating an intention of "goodbye."

The display controller 22c is a unit having the function of controlling the display device 21 to execute display processing. The display controller 22c of the present embodiment can control the display device 21 based on the surrounding status information acquired by the acquirer 22a, thereby executing the external display processing of displaying the person image 100. Based on the display contents according to the intention of the passenger of the vehicle V generated by the intention generator 22b, the display controller 22c of the present embodiment controls the display device 21, thereby executing the external display processing of displaying the person image 100. As described above, the display contents are, by the intention generator 22b, generated according to the surrounding image information included in the surrounding status information and the action determination result information. That is, the display contents are based on the surrounding status information acquired by the acquirers 13a, 22a. The display controller 22c of the present embodiment displays the person image 100 with the display contents generated by the intention generator 22b so that the external display processing of changing an expression or a gesture of a person indicated by the person image 100 according to, e.g., the surrounding status information can be executed.

For example, as illustrated in FIG. 3, in a case where crossing of the passerby A at a cross walk is predicated based on the action determination result information by the action determiner 13b and stop of the vehicle V is determined, the intention generator 22b generates the person image 100A with the display contents indicating the intention of "giving way." Then, after the processing of automatically stopping the vehicle V has been, for example, executed by the traveling controller 13c, the display controller 22c controls the display device 21 based on the display contents generated by the intention generator 22b, thereby executing the external display processing. Thus, the display controller 22c displays, on the display surface 21a, the person image 100A with the display contents indicating the intention of "giving way" generated by the intention generator 22b.

Figure 4:
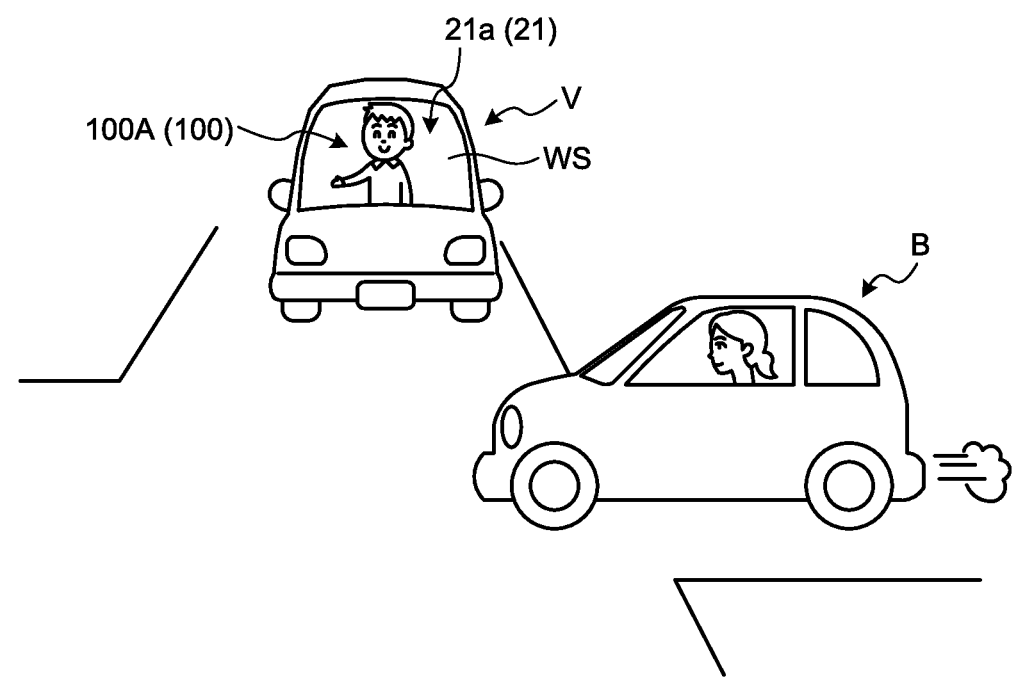
FIG. 4 is a schematic view illustrating one example of the display form of the display system according to the embodiment.
Figure 5:
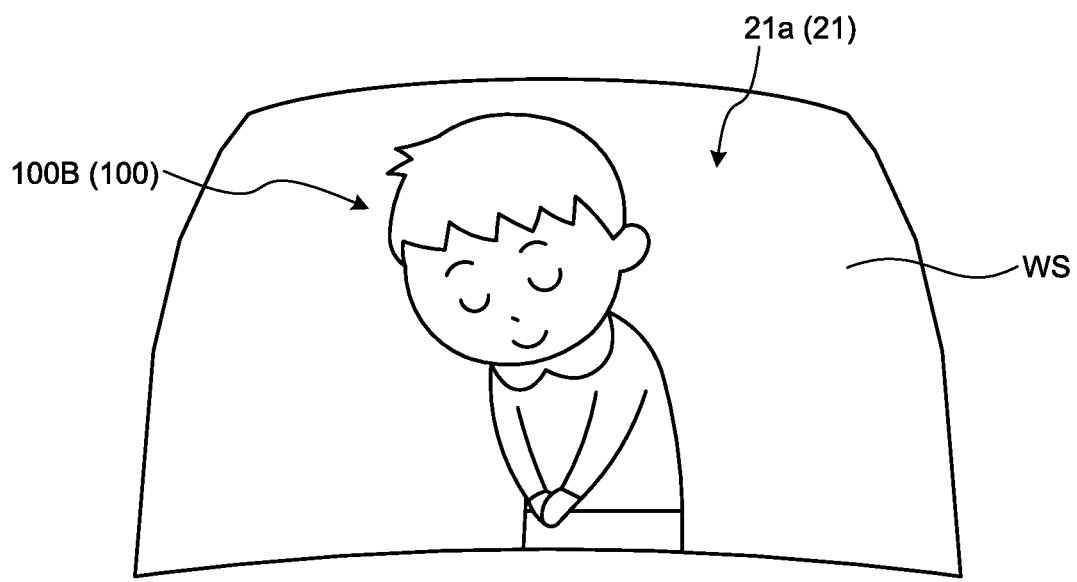
FIG. 5 is a schematic view illustrating one example of the display form of the display system according to the embodiment.

For example, as illustrated in FIG. 4, in a case where crossing of another vehicle B at a an intersection is predicated based on the action determination result information by the action determiner 13b and stop of the vehicle V is determined, the intention generator 22b also generates the person image 100A with the display contents indicating the intention of "giving way." Then, after the processing of automatically stopping the vehicle V has been, for example, executed by the traveling controller 13c, the display controller 22c controls the display device 21 based on the display contents generated by the intention generator 22b, thereby executing the external display processing. Thus, the display controller 22c displays, on the display surface 21a, the person image 100A with the display contents indicating the intention of "giving way" generated by the intention generator 22b. On the other hand, in a case where standby of another vehicle B at the intersection is, for example, predicated based on the action determination result information by the action determiner 13b and passage of the vehicle V through the intersection is determined, the intention generator 22b generates the person image 100B with the display contents indicating the intention of "appreciation" as illustrated in FIG. 5. Then, after the processing of causing the vehicle V to pass anterior to another vehicle B has been, for example, executed by the traveling controller 13c, the display controller 22c controls the display device 21 based on the display contents generated by the intention generator 22b, thereby executing the external display processing. Thus, the display controller 22c displays, on the display surface 21a, the person image 100B with the display contents indicating the intention of "appreciation" generated by the intention generator 22b.

Figure 6:
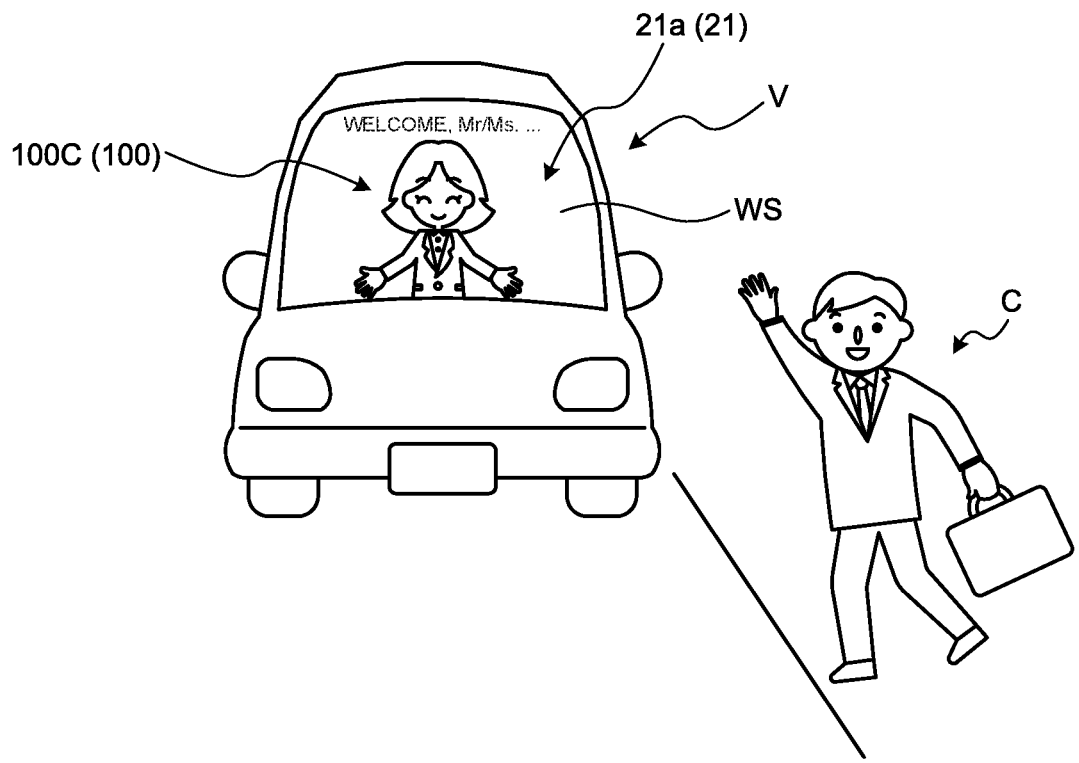
FIG. 6 is a schematic view illustrating one example of the display form of the display system according to the embodiment.
Figure 7:
FIG. 7 is a schematic view illustrating one example of the display form of the display system according to the embodiment.

For example, as illustrated in FIG. 6, in a case where the passerby C's intention to ride on the vehicle V is predicated based on the action determination result information by the action determiner 13b and stop of the vehicle V is determined, the intention generator 22b generates the person image 100C with the display contents indicating the intention of "welcome." Then, after the processing of automatically stopping the vehicle V has been, for example, executed by the traveling controller 13c, the display controller 22c controls the display device 21 based on the display contents generated by the intention generator 22b, thereby executing the external display processing. Thus, the display controller 22c displays, on the display surface 21a, the person image 100C with the display contents indicating the intention of "welcome" generated by the intention generator 22b. In this case, in addition to the person image 100C, the display controller 22c may display a character/image for complementing/supporting the display contents of the person image 100C, such as "Welcome, Mr/Ms. . . . ," on the display surface 21a. On the other hand, in a case where based on the action determination result information by the action determiner 13b, it is, for example, predicated that the passenger left the vehicle V moves away from the vehicle V and start of the vehicle V is determined, the intention generator 22b generates the person image 100D with the display contents indicating the intention of "goodbye" as illustrated in FIG. 7. Then, after the processing of starting the vehicle V has been, for example, executed by the traveling controller 13c, the display controller 22c controls the display device 21 based on the display contents generated by the intention generator 22b, thereby executing the external display processing. Accordingly, the display controller 22c displays, on the display surface 21a, the person image 100D with the display contents indicating the intention of "goodbye" generated by the intention generator 22b. In this case, in addition to the person image 100D, the display controller 22c may display a character/image for complementing/supporting the display contents of the person image 100D, such as "Goodbye, Mr/Ms. . . . ," on the display surface 21a.

Figure 8:
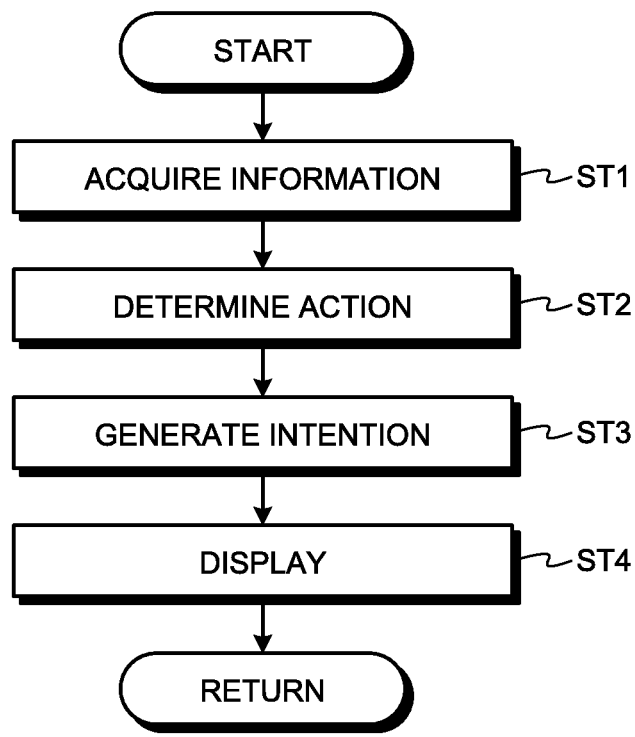
FIG. 8 is a flowchart illustrating one example of control in the in-vehicle system according to the embodiment.

Next, the outline of one example of control in the in-vehicle system will be described with reference to a flowchart of FIG. 8. Note that these control routines are repeatedly executed in a control cycle (a clock unit) of several ms to several tens of ms, for example.

First, the acquirer 13a of the controller 13 of the automatic driving system 10 acquires the vehicle state information, the surrounding status information, the internal status information, etc. detected by the detection device 12 (a step ST1).

Next, the action determiner 13b of the controller 13 of the automatic driving system 10 grasps the environment around the vehicle V based on, e.g., the surrounding status information acquired by the acquirer 13a at the step ST1, and predicts action of a person around the vehicle V to determine action of the vehicle V (a step ST2).

Next, the acquirer 22a of the controller 22 of the display system 20 acquires, from the controller 13, the vehicle state information, the surrounding status information, and the internal status information detected by the detection device 12 and the action determination result information determined by the action determiner 13b at the step ST2, for example. Then, the intention generator 22b of the controller 22 of the display system 20 generates, based on the surrounding status information, the action determination result information, etc., the display contents indicating the intention corresponding to action of the vehicle V determined at the step ST2 (a step ST3).

Next, the display controller 22c of the controller 22 of the display system 20 controls the display device 21 based on the display contents generated by the intention generator 22b at the step ST3, thereby executing the external display processing (a step ST4). Accordingly, the display controller 22c displays, on the display surface 21a, the person image 100 with the display contents generated by the intention generator 22b, and terminates a current control cycle. The processing transitions to a subsequent control cycle.

Note that in addition to the above-described external display processing, the display controller 22c of the present embodiment may be configured to control the display device 21 based on the internal status information acquired by the acquirers 13a, 22a, thereby executing the internal display processing of displaying the person image 100. In this case, as in, e.g., prediction of action of a person around the vehicle V, the action determiner 13b is configured to grasp environment inside the vehicle V based on, e.g., the internal image information included in the internal status information acquired by the acquirer 13a and the action prediction information stored in the storage 13B, thereby predicting action of a person inside the vehicle V. Then, based on, e.g., the internal image information included in the internal status information acquired by the acquirers 13a, 22a, information regarding predicted action, and the intention generation information stored in the storage 22B, the intention generator 22b generates the display contents indicating an intention as a response to predicated action of a person inside the vehicle V. Then, the display controller 22c controls the display device 21 based on the display contents generated by the intention generator 22b, thereby executing the internal display processing of displaying the person image 100. As described above, the display contents are, by the intention generator 22b, generated according to the internal image information included in the internal status information and the action information predicted from the internal image information. That is, the display contents are based on the internal status information acquired by the acquirers 13a, 22a. The display controller 22c described herein displays the person image 100 with the display contents generated by the intention generator 22b so that the internal display processing of changing an expression or a gesture of a person indicated by the person image 100 can be executed according to the internal status information etc. For example, in a case where the action determiner 13b predicts that the passenger inside the vehicle V will left the vehicle V, the intention generator 22b generates the person image 100D with the display contents indicating the intention of "goodbye" as described above with reference to FIG. 7. Then, after the processing of stopping the vehicle V has been, for example, executed by the traveling controller 13c, the display controller 22c controls the display device 21 based on the display contents generated by the intention generator 22b, thereby executing the internal display processing. Accordingly, the display controller 22c displays, on the display surface 21a, the person image 100D with the display contents indicating the intention of "goodbye" generated by the intention generator 22b.

In the in-vehicle system 1 and the display system 20 described above, the display controller 22c can control the display device 21 based on the surrounding status information to execute the external display processing, thereby performing displaying by means of the person image 100. As a result, as compared to, e.g., the case of simply displaying only character information etc., the in-vehicle system 1 and the display system 20 can perform more intuitive easily-understandable displaying for a person outside the vehicle V. Thus, even in a case where the in-vehicle system 1 and the display system 20 are, for example, applied to the vehicle V configured to execute the fully-automated driving without the driver oneself, the in-vehicle system 1 and the display system 20 can transmit the "intention of the passenger of the vehicle V" to a person around the vehicle V via the person image 100. Thus, the in-vehicle system 1 and the display system 20 can provide traffic environment using pleasant communication, and therefore, can provide safe/security environment.

Further, in the in-vehicle system 1 and the display system 20 described above, the display controller 22c can change an expression or a gesture of a person indicated by the person image 100 according to the surrounding status information, thereby displaying such an expression or gesture on the display device 21. As a result, the in-vehicle system 1 and the display system 20 can perform more intuitive easily-understandable displaying by means of an expression or a gesture of a person indicated by the person image 100.

Further, in the in-vehicle system 1 and the display system 20 described above, the display device 21 has the display surface 21a configured to display the person image 100 on the window shield WS. As a result, the in-vehicle system 1 and the display system 20 can display the person image 100 on the display surface 21a such that a person etc. outside the vehicle V easily views the person image 100. Moreover, for example, the in-vehicle system 1 and the display system 20 display the life-sized person image 100 on the display surface 21a so that intuitive easily-understandable displaying can be performed as if the driver is present.

Further, in the in-vehicle system 1 and the display system 20 described above, the display device 21 is also used as one configured to display the person image 100 at the position visible from the inside of the vehicle V. Moreover, in the in-vehicle system 1 and the display system 20, the display controller 22c controls the display device 21 based on the internal status information acquired by the acquirer 22a to execute the internal display processing, and therefore, displaying can be performed using the person image 100. As a result, the in-vehicle system 1 and the display system 20 can also perform intuitive easily-understandable displaying for a person etc. inside the vehicle V.

Note that the display system and the in-vehicle system according to the embodiment of the present invention as described above are not limited to those of the embodiment described above, and various changes can be made within the scope described in the claims.

Figure 9:
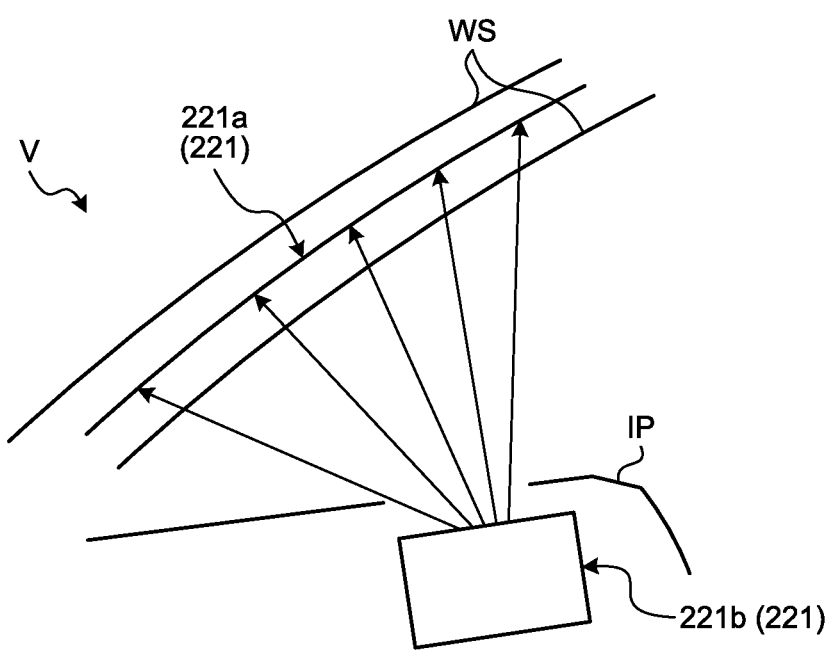
FIG. 9 is a schematic sectional view illustrating one example of a display device included in a display system according to a variation.

The display device 21 described above is not limited to the above-described configuration. For example, a display device 221 according to a variation illustrated in FIG. 9 has a display surface 221a configured to display the person image 100 on the window shield WS of the vehicle V. The display surface 221a of the present variation is configured such that a thin film screen is interposed as an intermediate film between the pair of window shields WS. The display surface 221a configured as the thin film screen is, by control by the display controller 22c, switchable between a transparent state in which light is permeable and a non-transparent state in which a light transmission rate is lower than that of the transparent state. The display surface 221a is brought into the transparent state in the case of not displaying the person image 100, and is brought into the non-transparent state in the case of displaying the person image 100. The display device 221 of the present variation includes, for example, a projection machine 221b provided in the instrumental panel IP, such as a projector. The display device 221 projects the display surface 221a in the non-transparent state with projection light from the projection machine 221b, the projection light indicating the person image 100. As a result, the display device 221 can display the person image 100 on the display surface 221a. Even in this case, the in-vehicle system 1 and the display system 20 can display the person image 100 on the display surface 221a such that a person outside the vehicle V easily views the person image 100. Thus, intuitive easily-understandable displaying can be performed.

Figure 10:
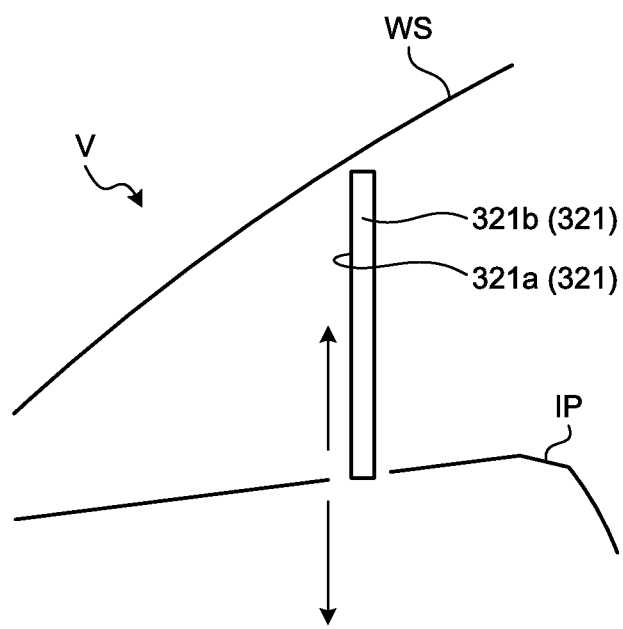
FIG. 10 is a schematic sectional view illustrating one example of a display device included in a display system according to a variation.

For example, a display device 321 according to a variation illustrated in FIG. 10 has a display surface 321a at a position facing the window shield WS inside the vehicle V. The display surface 321a of the present variation includes an image display device 321b such as a liquid crystal display, a plasma display, or an organic EL display. The image display device 321b including the display surface 321a is configured movable between a display position and a retraction position by control by the display controller 22c. The display position described herein is a position at which the display surface 321a displays the person image 100 at the position facing the window shield WS inside the vehicle V. On the other hand, the retraction position is a position at which the image display device 321b including the display surface 321a is retracted from the display position, such as a position at which the image display device 321b is housed in the instrumental panel IP. The display surface 321a is at the retraction position in the case of not displaying the person image 100, and is at the display position in the case of displaying the person image 100. The display device 321 can display the person image 100 on the display surface 321a in a state in which the display surface 321a is at the display position. Even in this case, the in-vehicle system 1 and the display system 20 can display the person image 100 on the display surface 321a such that a person outside the vehicle V easily view the person image 100, and intuitive easily-understandable displaying can be performed. Note that in this case, the display device 321 may include an image display device different from the image display device 321b on a rear side (a side opposite to the window shield WS) of the image display device 321b. Moreover, the display device 321 may be configured to display the person image 100 at a position visible by such a different image display device from the inside of the vehicle V.

Figure 11:
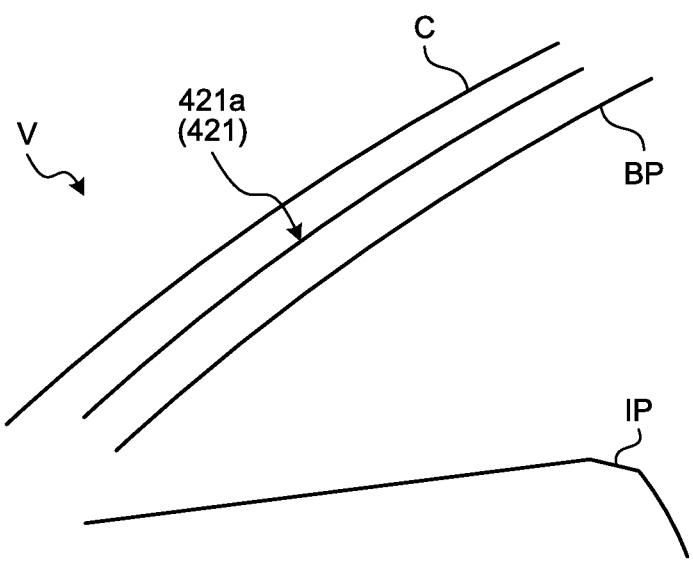
FIG. 11 is a schematic sectional view illustrating one example of a display device included in a display system according to a variation.

For example, a display device 421 according to a variation illustrated in FIG. 11 has a display surface 421a configured to display the person image 100 on a body member BP of the vehicle V. The body member BP described herein is a structural member forming a vehicle body of the vehicle V, and is a non-light-permeable (light blocking) member configured to block at least light (visible light) with a visible light component. The body member BP also functions as a partition wall configured to separate the inside and outside of the vehicle V. As described above, in a case where the vehicle V is a vehicle allowing the fully-automated driving, the driver oneself is sometimes absent in the vehicle V. In this case, in the vehicle V, the body member BP might be also used at a position at which the window shield WS is provided instead of, e.g., the window shield WS through which the inside and outside of the vehicle V can be viewed from each other. In this case, the display device 421 may be configured such that the display surface 421a is provided at the body member BP provided at the front portion (e.g., the position at which the window shield WS is provided in the above-described embodiment) of the vehicle V in the vehicle front-to-rear direction, for example. The display surface 421a of the present variation is configured such that, e.g., a thin film display of transparent EL or transparent liquid crystal is interposed as an intermediate film between the body member BP and a transparent protection member C. The transparent protection member C described herein is a member provided on the opposite side of the display surface 421a from a body member BP side and configured to cover and protect a surface of the display surface 421a on the side opposite to the body member BP side. The transparent protection member C includes a light-permeable transparent member through which at least a visible light component of light (visible light) is permeable so that the person image 100 displayed on the display surface 421a can be viewed from the outside of the vehicle V. As a result, the display device 421 displays the person image 100 on the display surface 421a provided at the body member BP so that the person image 100 can be displayed at the position visible from the outside (the vehicle outer side) of the vehicle V. Even in this case, the in-vehicle system 1 and the display system 20 can display the person image 100 on the display surface 421a such that a person outside the vehicle V easily views the person image 100, and intuitive easily-understandable displaying can be performed. Note that the body member BP provided with the display surface 421a is not limited to above, and may be a structural member forming a so-called door panel, for example.

Moreover, the display device may be a so-called head-up display (HUD) device configured such that display light indicating the person image 100 is reflected on the display surface provided at the window shield WS and the person image 100 is displayed as a virtual image.

In description above, the vehicle V has been, as one example, described as the vehicle allowing the automatic driving (the semi-automatic driving, the fully-automated driving), but is not limited to above. The vehicle V may be a vehicle allowing the manual driving for controlling behavior of the vehicle V according to driving operation by the driver of the vehicle V.

In description above, the detection device 12 is illustrated as one provided separately from the display system 20 and forming the automatic driving system 10, but is not limited to above. The detection device 12 may be directly connected to the interface 22A of the display system 20 without the controller 13 of the automatic driving system 10, and may be configured as part of the display system 20. In other words, the display system 20 may include the detection device 12 itself, and the acquirer 22a may directly acquire the vehicle state information, the surrounding status information, the internal status information, etc. from the detection device 12 without the controller 13. Similarly, the action determiner 13b may be configured as part of the controller 22 of the display system 20. That is, the display system 20 may include the action determiner 13b.

In description above, the window shield WS has been described as the so-called front glass, but is not limited to above. The window shield WS may be, for examples, a rear glass provided at a rear portion of the vehicle V in the vehicle front-to-rear direction or a side glass provided at a side portion of the vehicle V. That is, the display device 21, 221 may have the display surface 21a, 221a configured to display the person image 100 on the rear glass or the side glass of the vehicle V.

In description above, the display controller 22c has been described as one configured to change an expression or a gesture of a person indicated by the person image 100 according to the surrounding status information etc. in the external display processing, but is not limited to above. The display controller 22c may change, e.g., a person oneself other than an expression or a gesture of a person.

In the controller 13, 22 described above, each unit may be separately provided, and may be connected such that various electrical signals are exchangeable with each other. Alternatively, some functions may be realized by other controllers. Moreover, the programs, the applications, various types of data, etc. as described above may be updated as necessary, or may be stored in a server connected to the in-vehicle system 1 via an optional network. For example, all or some of the programs, the applications, various types of data, etc. as described above can be downloaded as necessary. For example, all processing functions included in the controllers 13, 22 or some optional functions thereof may be realized by a CPU etc. or a program interpreted and executed by the CPU etc., or may be realized as hardware using, e.g., a wired logic.

In the display system and the in-vehicle system according to the present embodiment, the controller can control the display device based on the surrounding status information to execute the external display processing, and therefore, displaying can be performed using the person image. As a result, the display system and the in-vehicle system provide an advantageous effect that easily-understandable displaying can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display system comprising:
a display device provided at a vehicle and configured to display a person image indicating a person at a position visible from an outside of the vehicle; and
a controller configured to control the display device based on surrounding status information indicating a surrounding status of the vehicle, thereby executing external display processing of displaying the person image, wherein
the display device displays the person image at a position visible from an inside of the vehicle, and
the controller controls the display device based on internal status information indicating an internal status of the vehicle, thereby executing internal display processing of displaying the person image.

2. The display system according to claim 1, wherein
the controller executes the external display processing of changing an expression or a gesture of the person indicated by the person image according to the surrounding status information.

3. The display system according to claim 1, wherein
the display device has a display surface configured to display the person image on a window shield, the window shield being provided at the vehicle and at least a visible light component of light being permeable through the window shield.

4. The display system according to claim 2, wherein
the display device has a display surface configured to display the person image on a window shield, the window shield being provided at the vehicle and at least a visible light component of light being permeable through the window shield.

5. The display system according to claim 1, wherein
the display device has a display surface movable between a display position at which the person image is displayed at a position facing a window shield inside the vehicle and a retraction position retracted from the display position, the window shield being provided at the vehicle and at least a visible light component of light being permeable through the window shield.

6. The display system according to claim 2, wherein
the display device has a display surface movable between a display position at which the person image is displayed at a position facing a window shield inside the vehicle and a retraction position retracted from the display position, the window shield being provided at the vehicle and at least a visible light component of light being permeable through the window shield.

7. The display system according to claim 1, wherein
the display device has a display surface configured to display the person image on a body member, the body member being provided at the vehicle and blocking at least light with a visible light component.

8. The display system according to claim 2, wherein
the display device has a display surface configured to display the person image on a body member, the body member being provided at the vehicle and blocking at least light with a visible light component.

9. An in-vehicle system comprising:
a display device provided at a vehicle and configured to display a person image indicating a person at a position visible from an outside of the vehicle;
a detection device configured to detect surrounding status information indicating a surrounding status of the vehicle; and
a controller configured to control the display device based on the surrounding status information detected by the detection device, thereby executing external display processing of displaying the person image, wherein
the display device displays the person image at a position visible from an inside of the vehicle, and
the controller controls the display device based on internal status information indicating an internal status of the vehicle, thereby executing internal display processing of displaying the person image.

10. A display system comprising:
a display device provided at a vehicle and configured to display a person image indicating a person at a position visible from an outside of the vehicle; and
a controller configured to control the display device based on surrounding status information indicating a surrounding status of the vehicle, thereby executing external display processing of displaying the person image, wherein
the display device has a display surface configured to display the person image on a body member, the body member being provided at the vehicle and blocking at least light with a visible light component.

* * * * *